United States Patent
Gonzaga

(10) Patent No.: US 7,293,595 B2
(45) Date of Patent: Nov. 13, 2007

(54) ROTATABLE WHEEL RIM SUPPORT GROUP PARTICULARLY FOR A TIRE ASSEMBLING-DISASSEMBLING MACHINE

(75) Inventor: Tullio Gonzaga, Correggio (IT)

(73) Assignee: Butler Engineering & Marketing, S.p.A., Rio Saliceto (IT)

( * ) Notice: Subject to any disclaimer, the term of this patent is extended or adjusted under 35 U.S.C. 154(b) by 0 days.

(21) Appl. No.: 11/434,205

(22) Filed: May 16, 2006

(65) Prior Publication Data
US 2006/0266481 A1    Nov. 30, 2006

(30) Foreign Application Priority Data
May 16, 2005    (IT) ................ VR2005A0059

(51) Int. Cl.
*B60B 30/08*  (2006.01)
*B60C 25/05*  (2006.01)
*B60C 25/01*  (2006.01)

(52) U.S. Cl. ................... 157/14; 157/1.1
(58) Field of Classification Search ........... 157/14, 157/1.1
See application file for complete search history.

(56) References Cited

U.S. PATENT DOCUMENTS

| 4,610,288 A | 9/1986 | Huinink et al. |
| 5,656,775 A * | 8/1997 | Kawabe ............ 73/487 |
| 6,109,327 A | 8/2000 | Gonzaga |
| 6,527,032 B2 * | 3/2003 | Corghi ............ 157/1.28 |

* cited by examiner

*Primary Examiner*—David B Thomas
(74) *Attorney, Agent, or Firm*—Birch, Stewart, Kolasch & Birch, LLP

(57) ABSTRACT

The present invention relates to a rotatable wheel rim support group designed to be mounted on an assembling-disassembling machine. The support group includes at least one pair of annular plate-shaped members designed to abut against the wheel rim on a side opposite to that of a removable locking device, the plate-shaped members being arranged facing and approachable to and retractable from one another about a control shaft, a plurality of friction engagement members disposed angularly displaced and partly formed in one of the annular plate-shaped members and partly in the other, and support and rotational motion transmission members between the control shaft and one of the annular plate-shaped members.

19 Claims, 4 Drawing Sheets

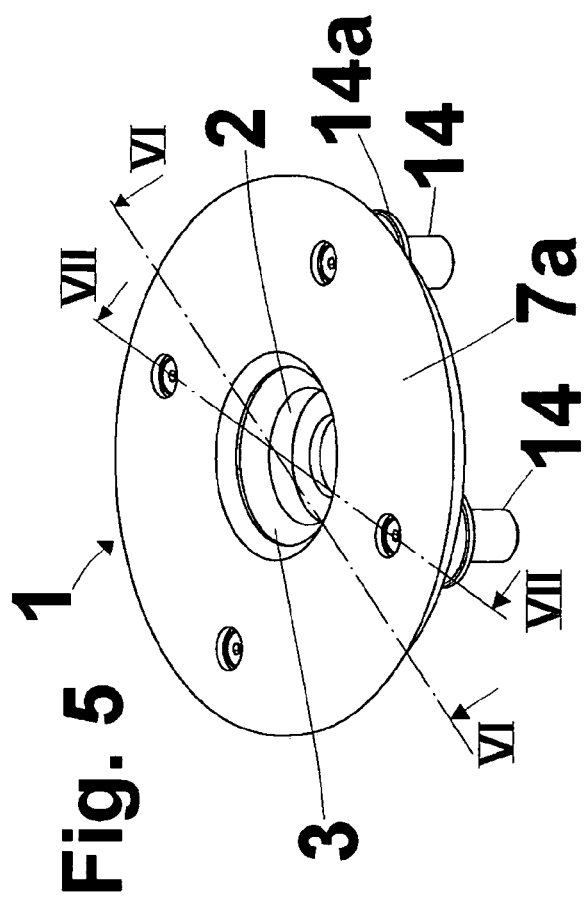
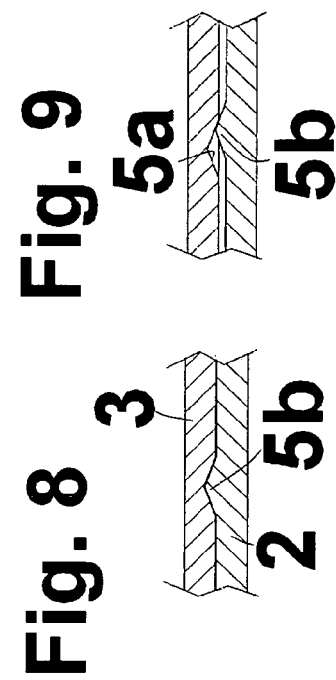
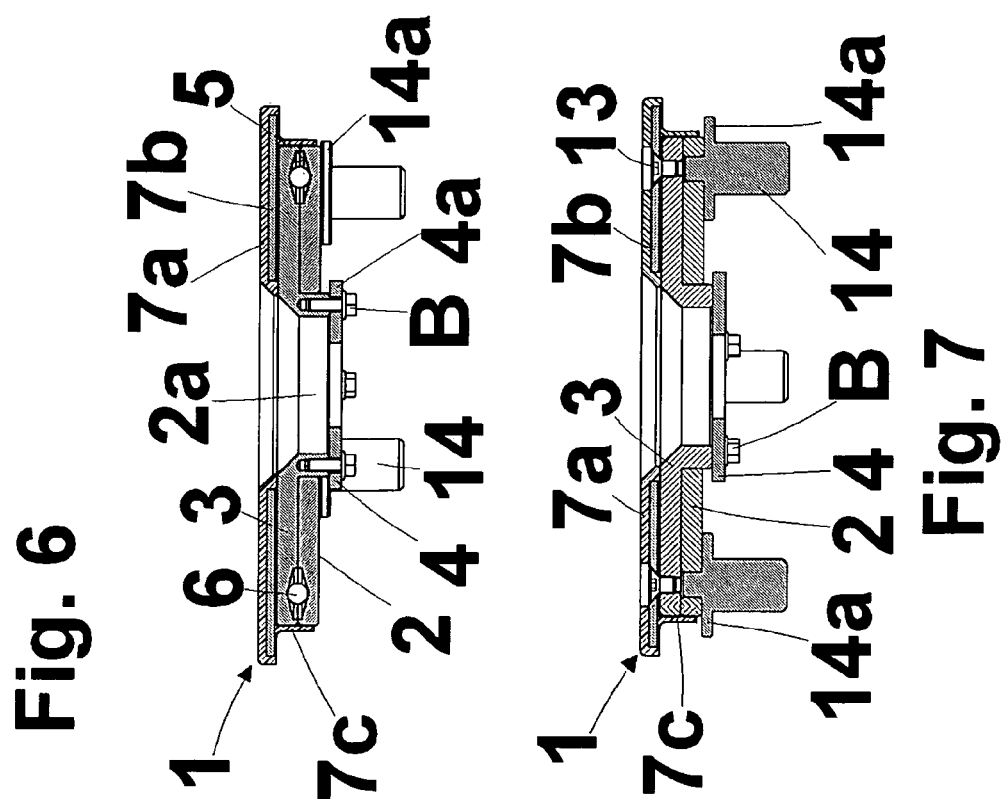

ROTATABLE WHEEL RIM SUPPORT GROUP PARTICULARLY FOR A TIRE ASSEMBLING-DISASSEMBLING MACHINE

FIELD OF INVENTION

The present invention relates to a rotatable wheel rim support group, particularly useful for a tire assembling-disassembling machine and arranged to removably and safely secure the wheel rim thereto.

A rotatable support group for a wheel rim of a tired wheel must suitably secure the wheel rim thereto to avoid, from a side, the wheel rim from being launched away in some extreme cases with serious consequences for the operator and people standing nearby the assembling-disassembling machine, and, from the other, poor efficiency in general in the mounting-dismounting and maintenance operations of a tire mounted on a wheel rim.

BACKGROUND OF INVENTION

U.S. Pat. No. 6,109,327 to the applicant of the present invention discloses a tire assembling-disassembling machine having a support base supporting a frusto-conical plate arranged to rotate, upon control, together with a control threaded shaft extending upwards from the support base where a pneumatic or electric motor suitable for driving the threaded shat is arranged. The wheel rim is inserted by the operator onto the control shaft and arranged to rest on the frusto-conical plate, the wheel rim being prevented from being removed from the shaft by a threaded bush or cone screwed onto the control shaft onto the wheel rim.

More particularly, a flanged support ring is keyed onto the control shaft and a counter-ring rests on it which is rigid in rotation with the frusto-conical plate. At the mutually facing surfaces of the flanged support ring and counter-ring mutually angularly spaced receiving seats are formed that extend tangentially. The receiving seats are delimited by four inclined-plane walls, i.e. two lower walls in the flanged support ring and two upper walls in the counter-ring. Preferably, a rolling element, e.g. a sphere or a roller, can be located in each receiving seat.

The counter-ring is mounted in such a way as to be able to effect limited controlled raising-lowering movements, and thus a friction engagement is established between ring and counter-ring. When the control shaft, and thus the flanged support ring, is set in rotation in one direction or in the other, the friction engagement due to the spheres located between ring and counter-ring is responsible for dragging in rotation also the counter-ring until the driving torque reaches a predetermined threshold value. At that point, each sphere will roll along the inclined walls in its respective receiving seat, which results in the counter ring and the wheel rim being raised with respect to the flanged ring. Thus, the wheel rim, becomes rigid in rotation with the frusto-conical plate. Such a structure ensures an efficient and stable rotation of the wheel rim on the plate even if the upper cone is not tightened against the wheel rim.

A device as that described above although, from one side, it provides a stable coupling between wheel rim and rotating plate without requiring special effort by the operator, from the other side it has a quite complex structure that, among other things, is difficult to assemble which means that highly trained operators must be employed.

SUMMARY OF THE INVENTION

The main object of the present invention is to provide a rotatable support group for a tire wheel rim which is very simple in structure and can be adapted to any conventional and non conventional tire assembling-disassembling machine.

Another object of the present invention is to provide a rotatable support group for a wheel rim of a tire, which is highly reliable and is cost effective.

These and other objects, that will better appear below, are achieved by a rotatable wheel rim support group designed to be mounted on a tire assembling-disassembling machine provided with a base, a control shaft extending from said base, removable locking means for said wheel rim, that is engageable, in use, on said control shaft and with a side of said wheel rim, and driving means for said control shaft, and comprising at least one pair of annular plate elements designed to abut, in use, against said wheel rim on opposite side with respect to said removable locking means, said plate elements being arranged mutually facing and approachable to, and retractable from one another on said control shaft, a plurality of friction engagement means angularly spaced from each other and formed partly in one of said annular plate elements and partly in the other, each of said friction engagement means in one plate element being designed to cooperate with a respective friction engagement means on the other plate element of said pair, thereby causing said annular plate elements to move away from one another when one of them is angularly displaced with respect to the other, and support and motion transmission means between said control shaft and one of said annular plate elements of said annular plate element pair.

BRIEF DESCRIPTION OF THE DRAWINGS

Further features and advantages of the present invention will become better apparent from the following detailed description of a number of presently preferred embodiments thereof, given by way of non-limiting examples of carrying out the invention, with reference to the accompanying drawings, in which:

FIG. 5 is view similar to that of FIG. 2 of a second embodiment of a support group according to the present invention;

FIG. 6 is an front elevational and diametrical section view taken along line VI-VI of wheel rim support group of FIG. 5;

FIG. 7 is a front elevational and diametral section view taken along line VII-VII of wheel rim support group of FIG. 5; and FIGS. 8 and 9 show details of an embodiment of engagement means according to the present invention with rotatable annular counterplate and annular rest plate in positions moved closer to and away from one another, respectively.

DESCRIPTION OF THE PREFERRED EMBODIMENTS

Figure 1:
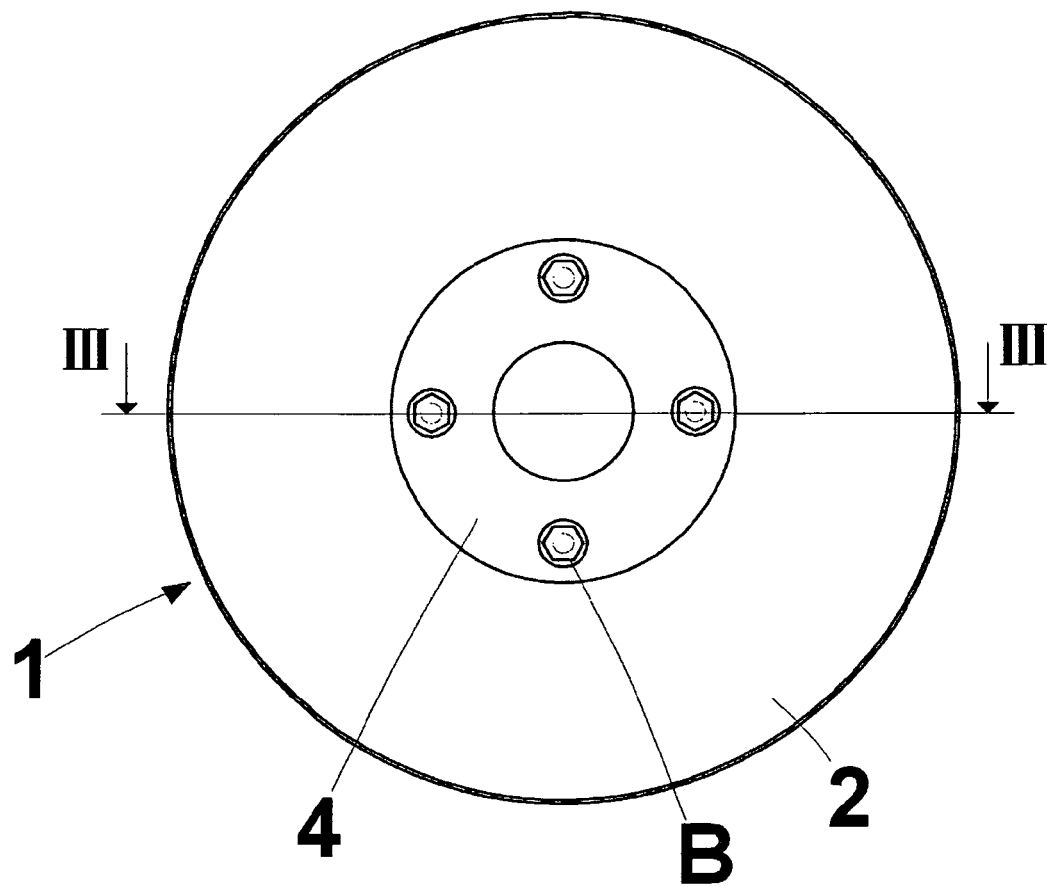
FIG. 1 is a bottom view of a wheel rim support group according to the present invention.
Figure 2:
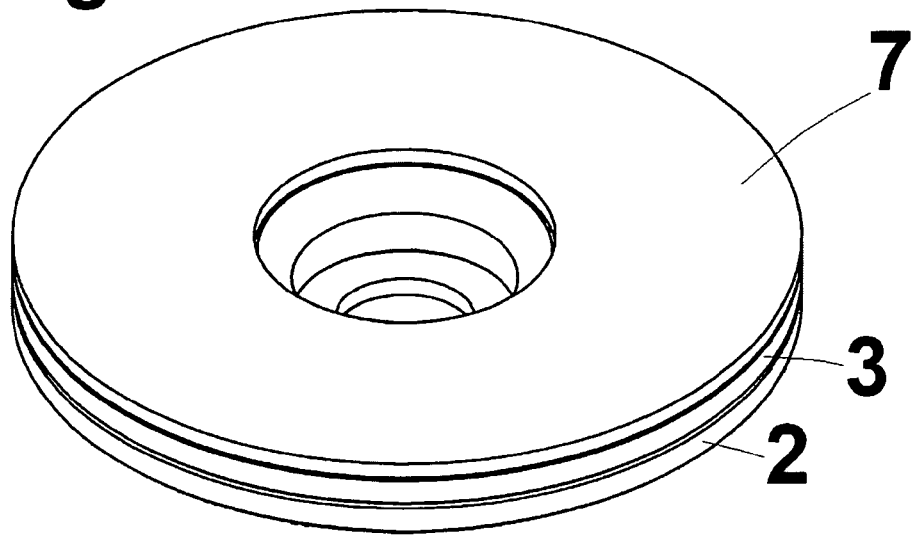
FIG. 2 is a perspective view slightly from above of the wheel rim support group of FIG. 1.

In the accompanying drawings, the same or similar parts or components have been indicated with the same reference numerals.

Figure 3:
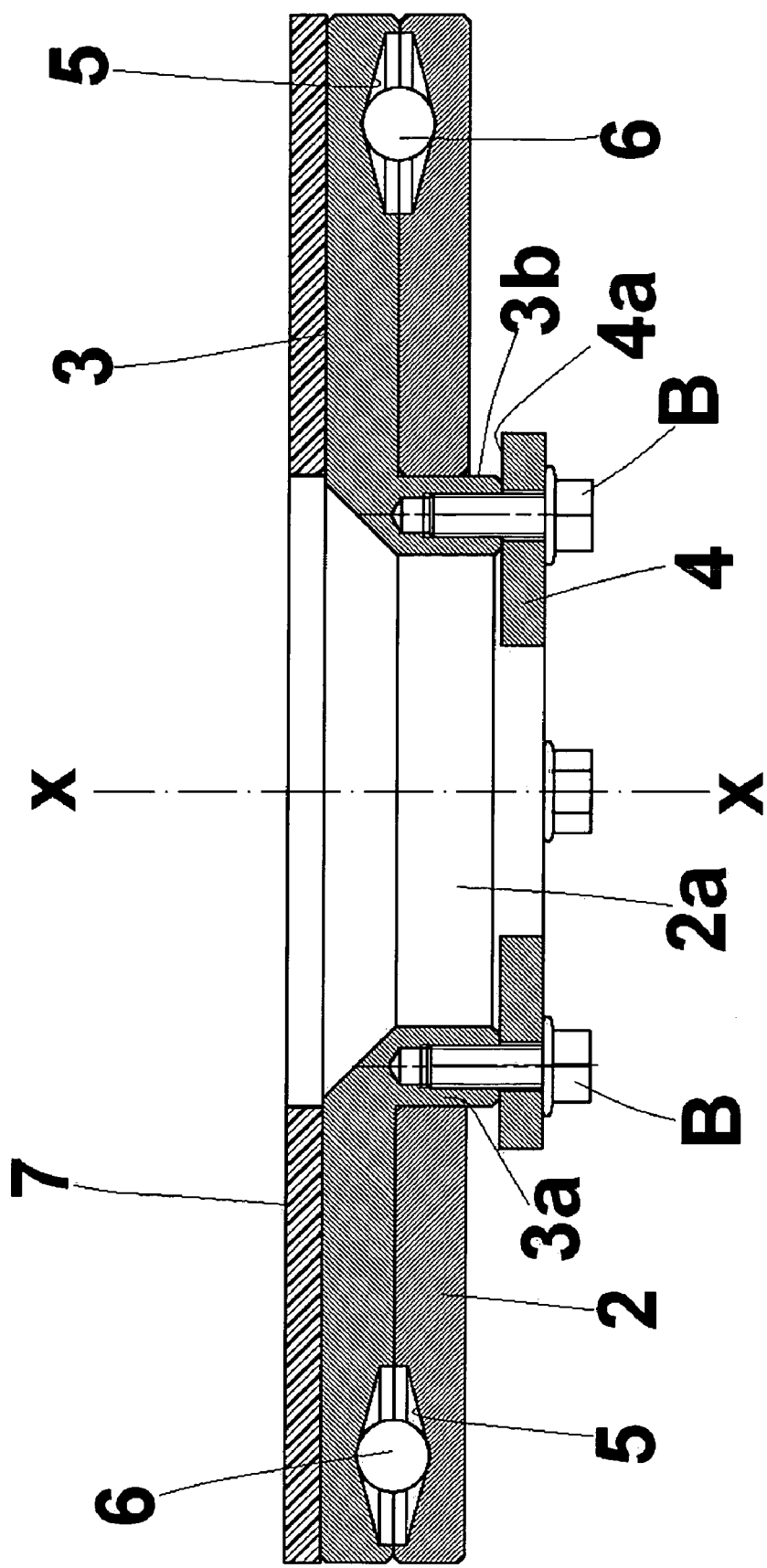
FIG. 3 is a front elevational and cross-sectional view taken along line III-III of FIG. 1.

With reference to the above listed Figures, a rotatable support group 1 for a wheel rim C is illustrated which comprises a pack of annular components, i.e. a rotatable annular counterplate 2 delimiting a central light 2a, and an annular rest or support plate 3 for a wheel rim, that, in use, is preferably located above the rotatable counterplate 2 and has an axial hub 3a which can be inserted, preferably with strict tolerances, in the central light 2a formed in the annular counterplate 2 and extends upwards from it with an end section 3b of predetermined height (FIG. 3). An annular abutment plate 4 larger in size than the hub 3a abuts against the hub 3a, whereby delimiting a peripheral shoulder 4a about it. The annular abutment plate 4 can be removably secured to the hub 3a in any suitable way, e.g. by means of bolts B screwable into the hub. The plates 2, 3 and 4 are coaxially mounted about a central axis x-x.

With this structure the annular counterplate 2 can be axially shifted with respect to the rest or support plate 3 by sliding on the hub 3a through a maximum length equal to the length of the end section 3b of the hub before abutting against the shoulder 4a of the abutment plate 4.

The annular counterplate 2 and the rest or support plate 3 delimit together, preferably half each, a plurality of receiving seats 5, which are angularly spaced from one another and preferably located close to the outer edges of the two plates 2 and 3, that advantageously have the same outer diameter. More particularly, each receiving seat comprises two or more inclined-plane walls which are tangentially oriented and converge towards the intermediate portion of their respective receiving seat, and thus each receiving seat has larger size at its intermediate portion, the size decreasing from the intermediate portion to the end portion in tangential direction. A rolling element, preferably a steel sphere or ball 6, is located in each receiving seat 5 for mutual rolling friction coupling between plates 2 and 3.

Figure 4:
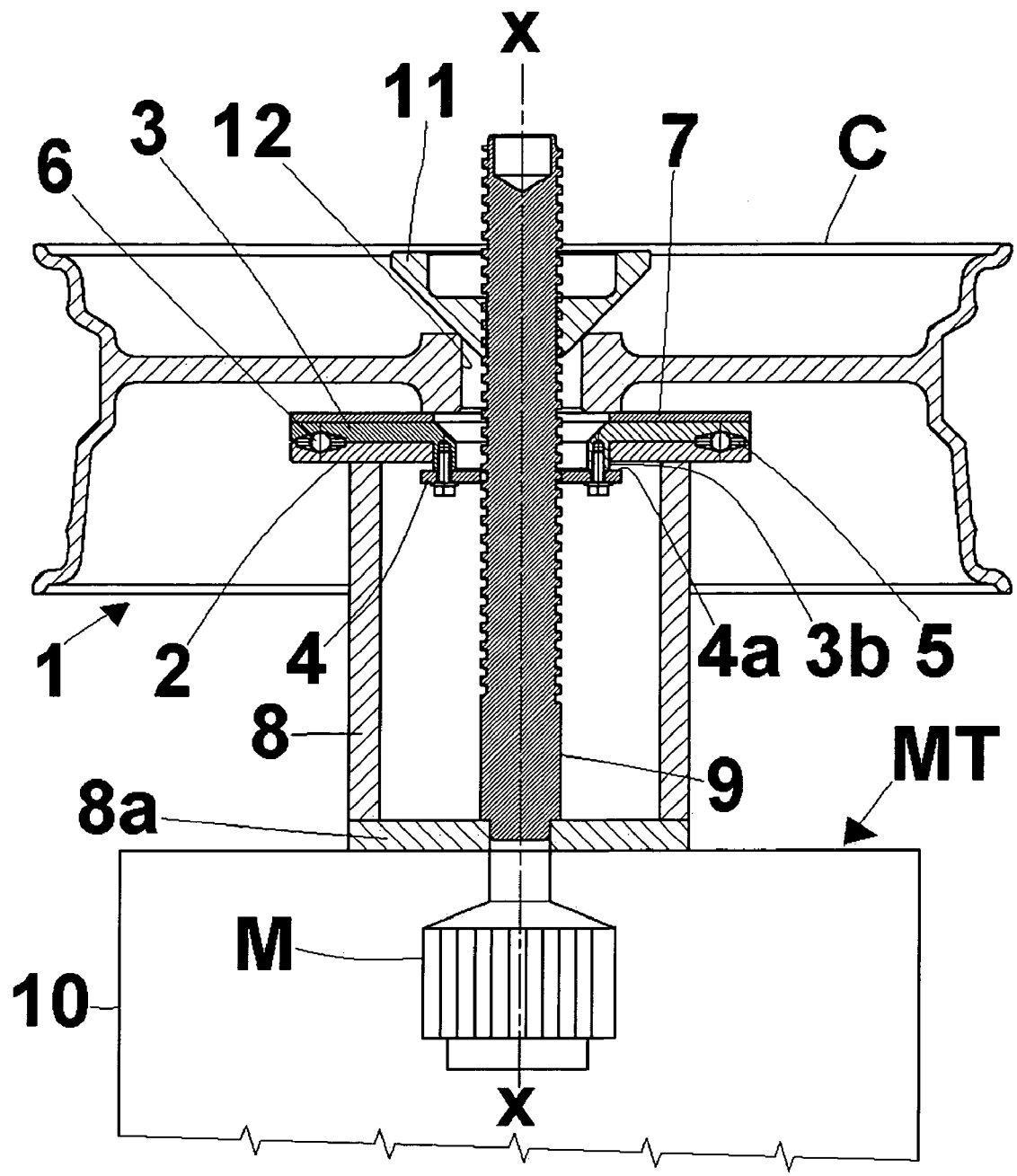
FIG. 4 is a in longitudinal diametral section view of the support group of FIG. 1 assembled with a substantially vertical axis of rotation on a tire assembling-disassembling machine, and on which a wheel rim is located.

With particular reference to FIG. 4 a rotatable wheel rim support group 1 according to the present invention is supported at the top thereof with its axis x-x arranged vertically by a tubular element 8 provided with a bottom 8a and coaxially keyed on a substantially vertical control shaft 9 which extends upwardly from the base 10 of a tire assembling-disassembling machine MT of any suitable type and axially through and beyond the group 1. The control shaft, at the bottom thereof, can be set in rotation by a motor M, e.g. a pneumatic or electric motor, as known in the art, whereas at the top thereof it is externally threaded and extends above the group 1 through a length at least equal to the width of a wheel rim C.

A wheel rim C is tightened against the rotatable support group 1 by means of an element with an outer conical surface or cone 11 which can be screwed onto the control shaft 9 and is suitable for abutting with its outer conical surface against the central hole 12 of the wheel rim C in order to force the wheel rim against the rest or support plate 3 of the underlying rotatable support group 1. The rest or support plate 3 is thus pressed against the underlying counterplate 2 supported by the tubular element 8.

When the control shaft 9 is set in rotation by the underlying motor, it drags with it in rotation both the cone 11 and the tubular element 8 through the keyed bottom 8a thereof which, in turn, causes the counterplate 2 to rotate. Owing to the friction between plates 2 and 3, also the rest and support plate 3, and thus the wheel rim C tightened against it, are dragged in rotation. This occurs, however, owing to the spheres 6 being provided in the various receiving seats 5, the spheres being thus forced to roll along inclined parallel planes (at least an upper one in the plate 3 and at least a lower one in the plate 2), which are inclined with respect to the lying plane of plates 2 and 3, in order to be moved, while being wedged between plates 2 and 3, from their rest to a work position. The forced rolling movement of the spheres or balls 6 results in a relative motion of plates 2 and 3 moving away from one another, i.e. the upper plate 3 slidable in the plate 2 at its hub portion 3a, is forced to raise, and thus to become further tightened against the wheel rim C, which on its opposite side is held in position by the cone 11.

Upon setting in rotation the control shaft 9, the locking action between wheel rim and rotatable support group 1 is increased, and thus the wheel rim C becomes rigid in rotation therewith.

A rotatable support group 1 according to the present invention as above described can ensure optimum securing action of the wheel rim C, which is safety and firmly dragged in rotation with no sliding during standard tire mounting/dismounting and bead releasing operations. In addition, the same rotatable support group 1 does not require a suitable rotatable plate for supporting the wheel rim C.

When the control shaft 9 stops, the spheres 6 between plates 2 and 3 return to their rest position, thereby allowing the plates 2 and 3 to move closer.

Advantageously, the rest and support face of plate 3 is provided rough in order to ensure higher friction between plate and wheel rim C. If desired, on the rest and support face of plate 3 one or more annular gasket seal elements or seals 7 (FIG. 3) are provided that are made of a material having a high friction coefficient, e.g. rubber, preferably glued to plate 3.

According to particularly preferred embodiment, the seal element 7 comprises two annular concentric seals: one 7a in contact with the rest and support plate 3, and the other 7b located in a recess formed in the seal 7a (FIGS. 5 to 7). The annular seal 7a has a peripheral tubular edge which protrudes from plate 3. At the tubular edge a tubular section 7c extends upwardly which is designed to act as a belt for substantially wrapping plates 2 and 3 to prevent powder or other undesired material from entering the space between plates 2 and 3, in particular when plates 2 and 3 are moved away from one another.

Preferably, seals 7a and 7b are held together by a plurality of screws 13, screwable into suitable threaded bores formed in the plate 3 (FIGS. 5 and 7).

FIGS. 5 to 7 show a preferred embodiment of engagement means between rotatable support group 1 and tubular element 8 keyed onto the control shaft 9. Such engagement means comprises a plurality of tenon or pin elements 14, which are angularly displaced along the rotatable support group 1 and designed to engage at one end thereof with suitable bores formed in the counterplate 2 and at the other end thereof with a suitable seat formed in the front head of the tubular element 8. For better stability, each pin element 14 is provided with an intermediate flange 14a, which, in use, is located between counterplate 2 and tubular element 8.

The above described rotatable support group is susceptible to numerous modifications and variations within the scope as defined by the claims.

Thus, for example, the seat 5 with rolling element 6 therein can be replaced by a plurality of recesses 5a formed in one plate 2 or 3, such recesses being angularly displaced from one another and each delimiting two converging inclined planes extending substantially in a tangential direction, whereas the other plate 3 or 2 is provided with a corresponding plurality of lugs 5b angularly displaced from one another and each delimiting two converging inclined planes in relief each suitable for sliding friction matching or coupling with a respective recess 5a (FIG. 8). The counterplate 2 under stress is forced to advance in the direction of rotation of the control shaft 9 with respect to the rest or support plate 3, and thus mutual sliding of one of inclined planes of each recess with respect to a corresponding inclined plane of its respective lug will occur, whereby plate 3 will be moved away from plate 2 (FIG. 9) and consequent increase in the locking action of the rotatable support group 1 against the wheel rim C.

Of course, the control shaft 9 can be arranged either vertically as shown in FIG. 4, or horizontally.

The invention claimed is:

1. A rotatable wheel rim support group designed to be mounted on a tire assembling-disassembling machine provided with a base, a control shaft extending from said base, removable locking means for said wheel rim, that is engageable, in use, on said control shaft and with a side of said wheel rim, and driving means for said control shaft, and comprising at least one pair of annular plate elements designed to abut, in use, against said wheel rim on opposite side with respect to said removable locking means, said plate elements being arranged mutually facing and approachable to, and retractable from one another on said control shaft, a plurality of friction engagement means angularly spaced from each other and formed partly in one of said annular plate elements and partly in the other, each of said friction engagement means in one plate element being designed to cooperate with a respective friction engagement means on the other plate element of said pair, thereby causing said annular plate elements to move away from one another when one of them is angularly displaced with respect to the other, and support and motion transmission means between said control shaft and one of said annular plate elements of said annular plate element pair, said support and rotational motion transmission means comprising a tubular member extending from said base to support at the top thereof said pair of annular plate elements, and a bottom portion rigid in rotation with said control shaft, wherein one annular counterplate member of each pair has a central opening and is designed to face said tubular member, whereas the other rest or support plate member is designed to face a wheel rim to be supported, and is provided with an axial hub insertable into said central opening of said annual plate member.

2. A rotatable wheel rim support group as claimed in claim 1, wherein said friction engagement means comprises sliding friction means.

3. A rotatable support group as claimed in claim 2, wherein said sliding friction means comprises at least one recess formed in one of said plate elements of said pair and delimited by at least one bas-relief inclined-plane wall, which extends, in use, substantially in a transversal direction with respect to the distance from said control shaft, and the other plate element of said pair being provided with at least one respective lug comprising at least one relief inclined-plane wall extending substantially parallel to its respective bas-relief inclined plane wall and designed to slidably engage therewith.

4. A rotatable support group as claimed in claim 1, wherein said friction engaging means comprises rolling friction means.

5. A rotatable support group as claimed in claim 4, wherein said rolling friction means comprises at least one receiving scat partly formed in one of said plate elements of said couple and partly in the other plate element and comprises at least two substantially parallel inclined plane walls which, in use, extend in a transversal direction with respect to the distance from said control shaft, and rolling means located in each receiving seat.

6. A rotatable support group as claimed in claim 5, wherein said rolling means comprises a spherical or ball element.

7. A rotatable support group as claimed in claim 1, comprising an abutting plate member securable to said axial hub with interposition of said counterplate member to delimit a peripheral shoulder for said annular counterplate member.

8. A rotatable support group as claimed in claim 1, wherein at said rest or support plate member at least one annular seal member made of a high friction coefficient material is provided for contacting said wheel rim.

9. A rotatable support group as claimed in claim 8, wherein said seal member comprises a first annular seal member designed to remain in contact with said rest or support plate member, and a second annular seal member located in a recess formed in said first seal member.

10. A rotatable support group as claimed in claim 8, wherein said seal member comprises a first annular seal member designed to remain in contact with said rest or support plate member, and a second annular seal member located in a recess formed in said first seal member and wherein said first annular seal member has an annular peripheral zone substantially winding said annular plate members.

11. A rotatable support group as claimed in claim 8, wherein said seal member comprises a first annular seal member designed to remain in contact with said rest or support plate member, and a second annular seal member located in a recess formed in said first seal member, and said rotatable support group comprises a plurality of screw members screwable into respective bores angularly displaced from one another and formed in said rest or support plate for securing said annular seal members.

12. A rotatable support group as claimed in claim 1, comprising engagement means between said pair of annular plate members and said tubular member.

13. A rotatable support group as claimed in claim 1, comprising engagement means between said pair of annular plate members and said tubular member, and wherein said engagement means comprises a plurality of angularly displaced pin members designed to engage, at one end thereof with a respective hole formed in said annular counterplate member and, at the other end thereof, with a suitable seat formed at the front head of said tubular member.

14. A rotatable support group as claimed in claim 13, comprising engagement means between said pair of annular plate members and said tubular member, and wherein said engagement means comprises a plurality of angularly displaced pin members designed to engage, at one end thereof with a respective hole formed in said annular counterplate member and, at the other end thereof, with a suitable seat formed at the front head of said tubular member, and wherein each pin member has an intermediate flange, which, in use, is arranged between said annular counterplate member and said tubular member.

15. An assembling-disassembling machine, comprising a rotatable support group as claimed in claim 1.

16. A rotatable wheel rim support group designed to be mounted on a tire assembling-disassembling machine provided with a base, a control shaft extending from said base, removable locking means for said wheel rim, that is engageable, in use, on said control shaft and with a side of said wheel rim, and driving means for said control shaft, and comprising at least one pair of annular plate elements designed to abut, in use, against said wheel rim on opposite side with respect to said removable locking means, said plate elements being arranged mutually facing and approachable to, and retractable from one another on said control shaft, a plurality of friction engagement means angularly spaced from each other and formed partly in one of said annular plate elements and partly in the other, each of said friction engagement means in one plate element being designed to cooperate with a respective friction engagement means on the other plate element of said pair, thereby causing said annular plate elements to move away from one another when one of them is angularly displaced with respect to the other, and support and motion transmission means between said control shaft and one of said annular plate elements of said annular plate element pair, said support and rotational motion transmission means comprising a tubular member extending from said base to support at the top thereof said pair of annular plate elements, and a bottom portion rigid in rotation with said control shaft, wherein at said rest or support plate member at least one annular seal member made of a high friction coefficient material is provided for contacting said wheel rim.

17. A rotatable support group as claimed in claim 16, wherein said seal member comprises a first annular seal member designed to remain in contact with said rest or support plate member, and a second annular seal member located in a recess formed in said first seal member.

18. A rotatable support group as claimed in claim 16, wherein said seal member comprises a first annular seal member designed to remain in contact with said rest or support plate member, and a second annular seal member located in a recess formed in said first seal member and wherein said first annular seal member has an annular peripheral zone substantially winding said annular plate members.

19. A rotatable support group as claimed in claim 16, wherein said seal member comprises a first annular seal member designed to remain in contact with said rest or support plate member, and a second annular seal member located in a recess formed in said first seal member, and said rotatable support group comprises a plurality of screw members screwable into respective bores angularly displaced from one another and formed in said rest or support plate for securing said annular seal members.

* * * * *